(12) United States Patent
Martignon

(10) Patent No.: US 6,698,174 B2
(45) Date of Patent: Mar. 2, 2004

(54) TOOL LIFTING APPARATUS FOR GARDENING VEHICLES, SUCH AS LAWN MOWERS OR THE LIKE

(75) Inventor: Girolamo Martignon, Borgoricco (IT)

(73) Assignee: Antonio Carraro S.p.A., Campodarsego (IT)

( * ) Notice: Subject to any disclaimer, the term of this patent is extended or adjusted under 35 U.S.C. 154(b) by 0 days.

(21) Appl. No.: 10/178,247

(22) Filed: Jun. 25, 2002

(65) Prior Publication Data
US 2003/0005676 A1 Jan. 9, 2003

(30) Foreign Application Priority Data
Jul. 6, 2001 (IT) .................... PD20010058 U

(51) Int. Cl.[7] .................... A01D 34/03; A01D 34/43; A01D 34/64
(52) U.S. Cl. .................... 56/17.1; 56/15.6; 56/15.8
(58) Field of Search .................... 56/17.1, 208, 10.4, 56/15.8, 15.6, 14.7, DIG. 9, DIG. 3

(56) References Cited

U.S. PATENT DOCUMENTS

| | | | | |
|---|---|---|---|---|
| 3,266,230 A | * | 8/1966 | Rowbotham | 56/208 |
| 3,643,407 A | * | 2/1972 | Hubbard et al. | 56/10.2 E |
| 4,212,144 A | * | 7/1980 | Raineri | 56/15.8 |
| 4,473,993 A | * | 10/1984 | Jennings et al. | 56/208 |
| 4,829,754 A | * | 5/1989 | Shimamura et al. | 56/15.9 |
| 4,887,686 A | * | 12/1989 | Takei et al. | 180/211 |
| 4,896,489 A | * | 1/1990 | Wykhuis | 56/15.9 |
| 4,993,216 A | * | 2/1991 | Covington et al. | 56/15.9 |
| 5,239,812 A | * | 8/1993 | Samejima et al. | 56/15.6 |
| 5,687,555 A | * | 11/1997 | Klein | 56/249 |

FOREIGN PATENT DOCUMENTS

| | | |
|---|---|---|
| EP | 1 068 786 | 1/2001 |
| FR | 2 627 660 | 9/1989 |

* cited by examiner

Primary Examiner—Árpád Fábián Kovács
(74) Attorney, Agent, or Firm—Guido Modiano; Albert Josif; Daniel O'Byrne

(57) ABSTRACT

A tool lifting apparatus for gardening vehicles such as lawn mowers or the like, of the type that comprises a lever-type frame, which supports the tool and is associated with hydraulic-cylinder lifting actuators, coupled between the frame and the vehicle chassis. The lever-type frame is coupled to the vehicle chassis to perform oscillations with respect to a longitudinal axis. The lever-type frame defines a third-class lever in which the lever fulcrum is arranged to the rear of, and parallel to, the front axle of the vehicle and to the rear of the actuators.

7 Claims, 5 Drawing Sheets

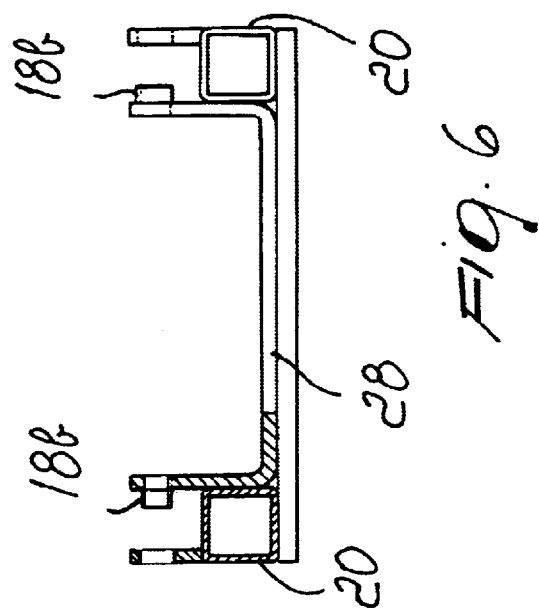
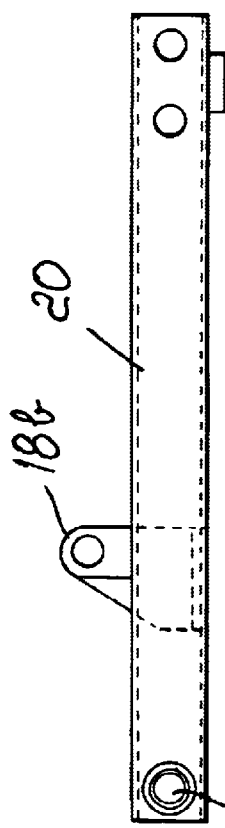
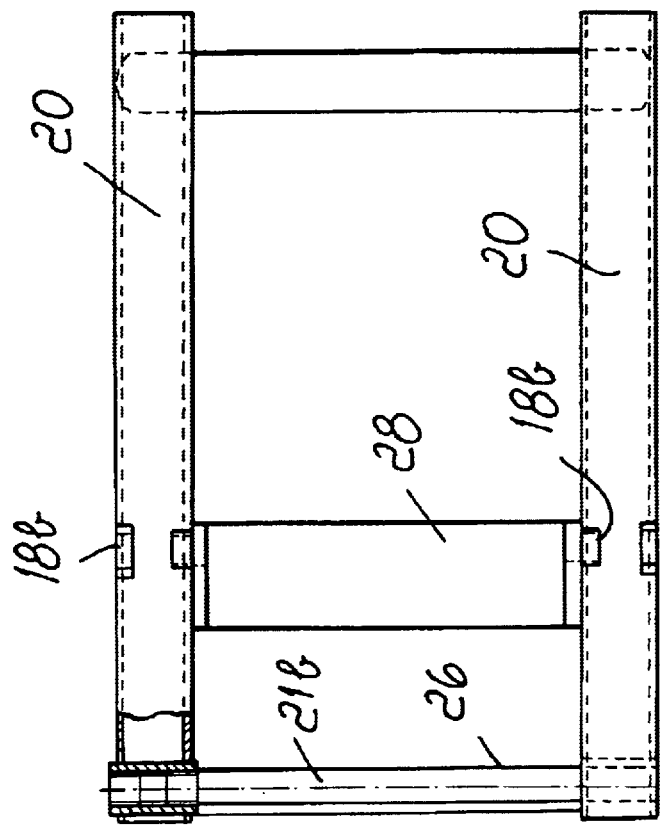

TOOL LIFTING APPARATUS FOR GARDENING VEHICLES, SUCH AS LAWN MOWERS OR THE LIKE

BACKGROUND OF THE INVENTION

The present invention relates to an improved tool lifting. apparatus, particularly but not exclusively useful for gardening vehicles such as lawn mowers or the like.

As is known, in the field of gardening, currently vehicles such as lawn mowers or the like are used, that relieve the operators from physically onerous tasks, increasing the productivity and precision of many operations.

In particular, and merely as an example, lawn rmowers are currently widely used which are substantially constituted by self-propelled vehicles provided with rotary-blade tools.

These tools, which generally have a flattened shape and are provided with wheels for resting on the ground, are mounted on lifting apparatuses that are rigidly coupled to the vehicles.

The coupling to these apparatuses is articulated in order to provide a certain freedom of motion and allow to follow the unevenness of the ground.

However, this freedom of motion is very limited and is unable to adapt to all operating situations.

Despite the variety of embodiments, these lifting apparatuses substantially comprise an actuation section that is fixed to the vehicle chassis and is connected to a lifting section.

The fulcrum of the action of the actuation section and the lifting actuators are normally arranged upstream of the front axle of the vehicle, adjacent to the active region of the lifting section, so that the lifting angle is not great and is indeed insufficient to overcome obstacles.

An apparatus has recently been devised by the same Applicant; the structure of the apparatus comprises a lever-type frame, which supports the tool and is associatd with hydraulic-cylinder lifting actuators that are rigidly coupled between said tool and the vehicle chassis.

The lever-type frame is rigidly coupled to the chassis of the vehicle so that it can oscillate with respect to a longitudinal axis, and the lever-type frame defines a first-class (central-fulcrum) lever, in which the fulcrum is arranged to the rear of, and is parallel to, the front axle of the vehicle.

Although such apparatus has been appreciated by the market, it nonetheless appears to be susceptible of improvements, related mostly to bulk reduction.

SUMMARY OF THE INVENTION

The aim of the present invention is to provide a tool lifting apparatus for gardening vehicles such as lawn mowers or the like, whose structure is more compact than of known types.

Within this aim, an object of the present invention is to be able to make the tool follow the terrain accurately, to pass any obstacle without problems, and to make the provided actuators work in an optimum manner during the active lifting step.

Another object of the present invention is to provide a lifting apparatus that has a sturdy and functionally flexible structure that is totally risk-free for the operator.

Another object of the invention is to provide a lifting apparatus whose structure can be adapted to the most disparate types of vehicle, optionally including vehicles that are already commercially available.

A further object of the invention is to provide a lifting apparatus that is particularly flexible in terms of application and simple to use for the operator.

Still another object of, the present invention is to provide a lifting apparatus whose structure allows production at costs that are competitive with respect to apparatuses having a similar functionality and with known systems and technologies.

This aim and these and other objects that will become better apparent hereinafer are achieved by an improved tool lifting apparatus as per claim 1.

BRIEF DESCRIPTION OF THE DRAWINGS

Further characteristics and advantages of the present invention will become better apparent from the description of an embodiment thereof, illustrated by way of non-limitative example in the accompanying drawings and figures, wherein:

FIGS. 5 to 7 are enlarged-scale orthographic projection views of a detail of the apparatus of FIG. 1.

DESCRIPTION OF THE PREFERRED EMBODIMENTS

Figure 1:
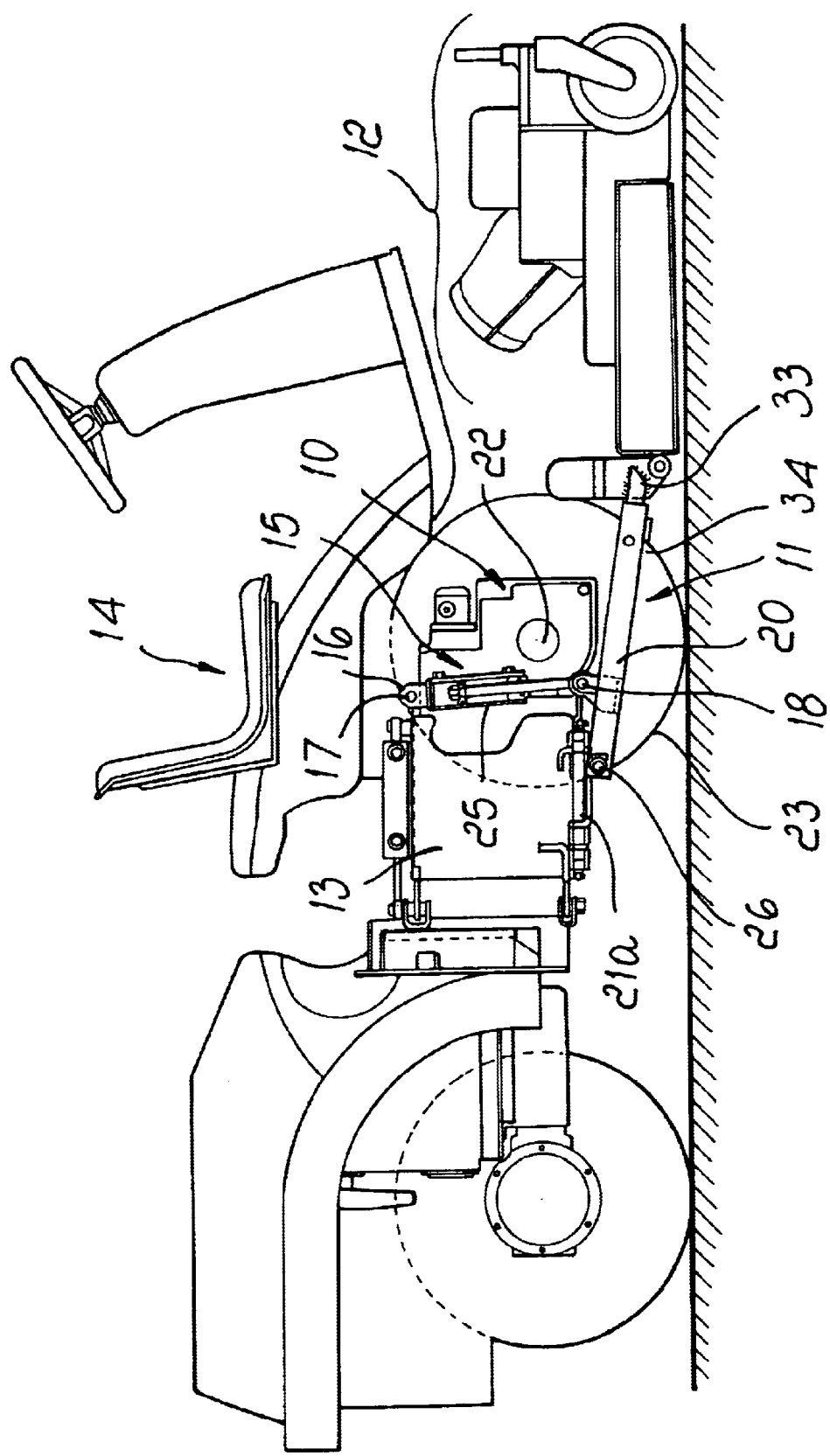
FIG. 1 is a partially sectional side view of an apparatus having the structure according to the invention, applied to a lawn mower.
Figure 2:
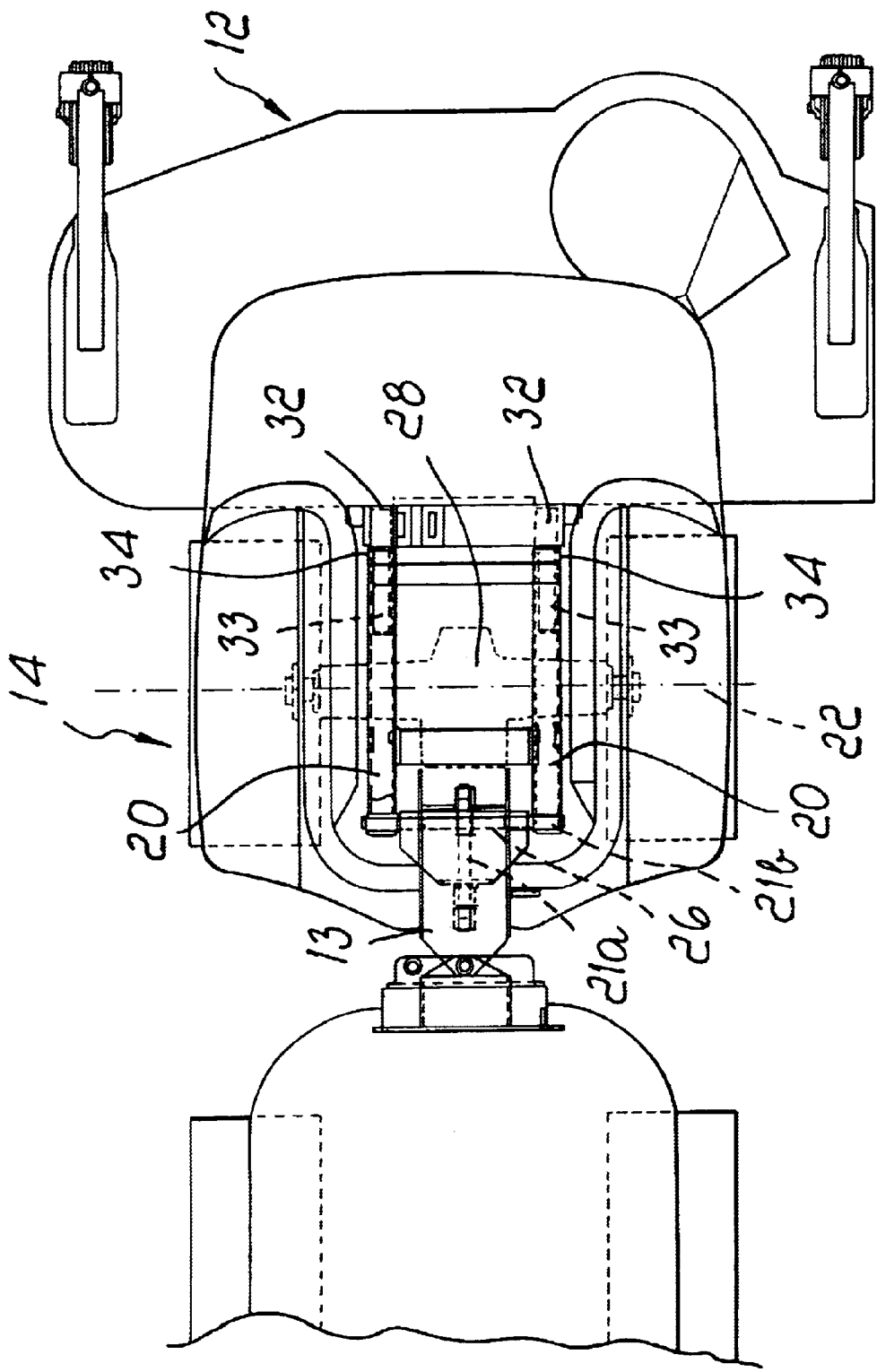
FIG. 2 is a top view of the apparatus of FIG. 1.
Figure 3:
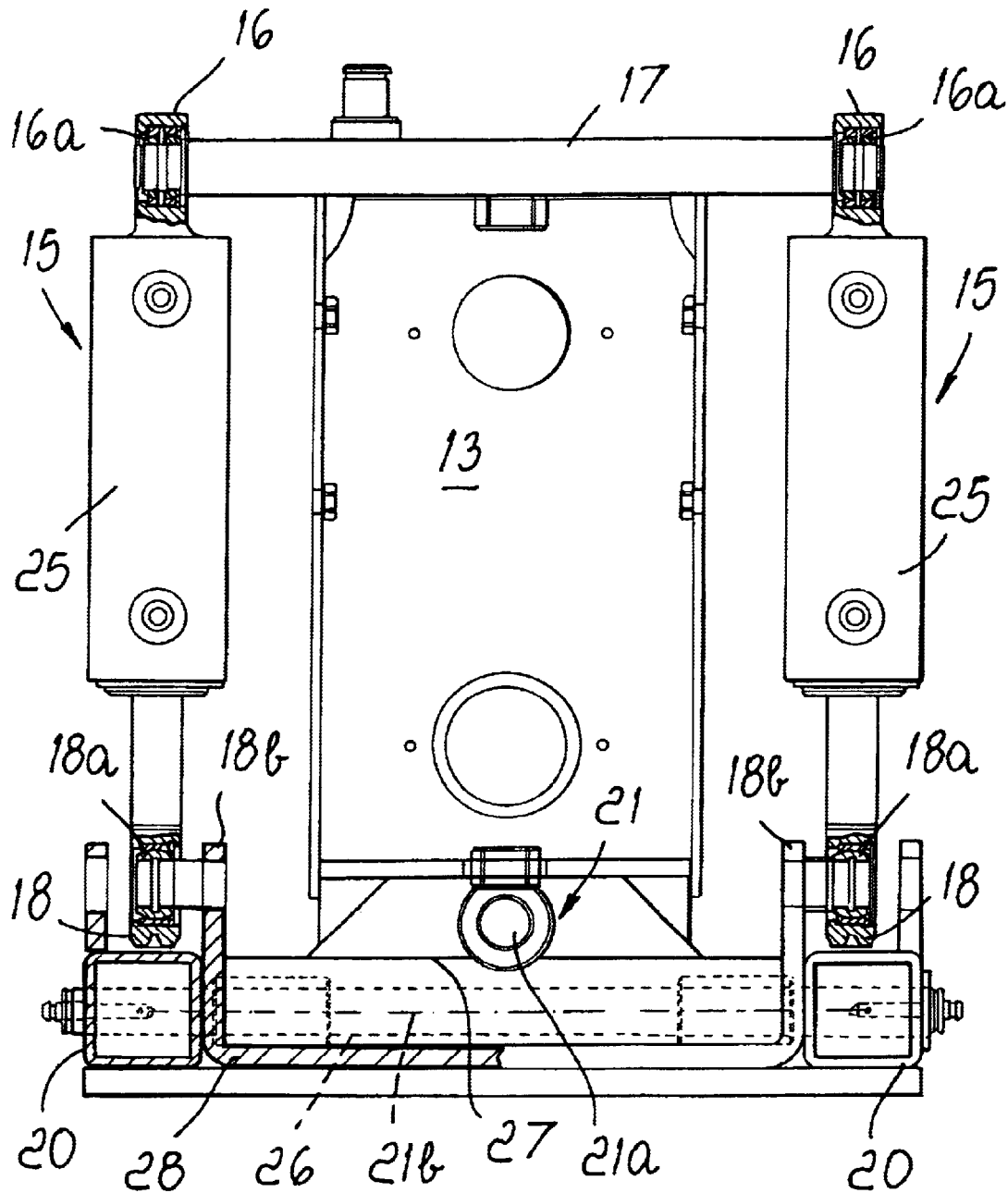
FIG. 3 is a partially sectional front view of the apparatus of FIG. 1.
Figure 4:
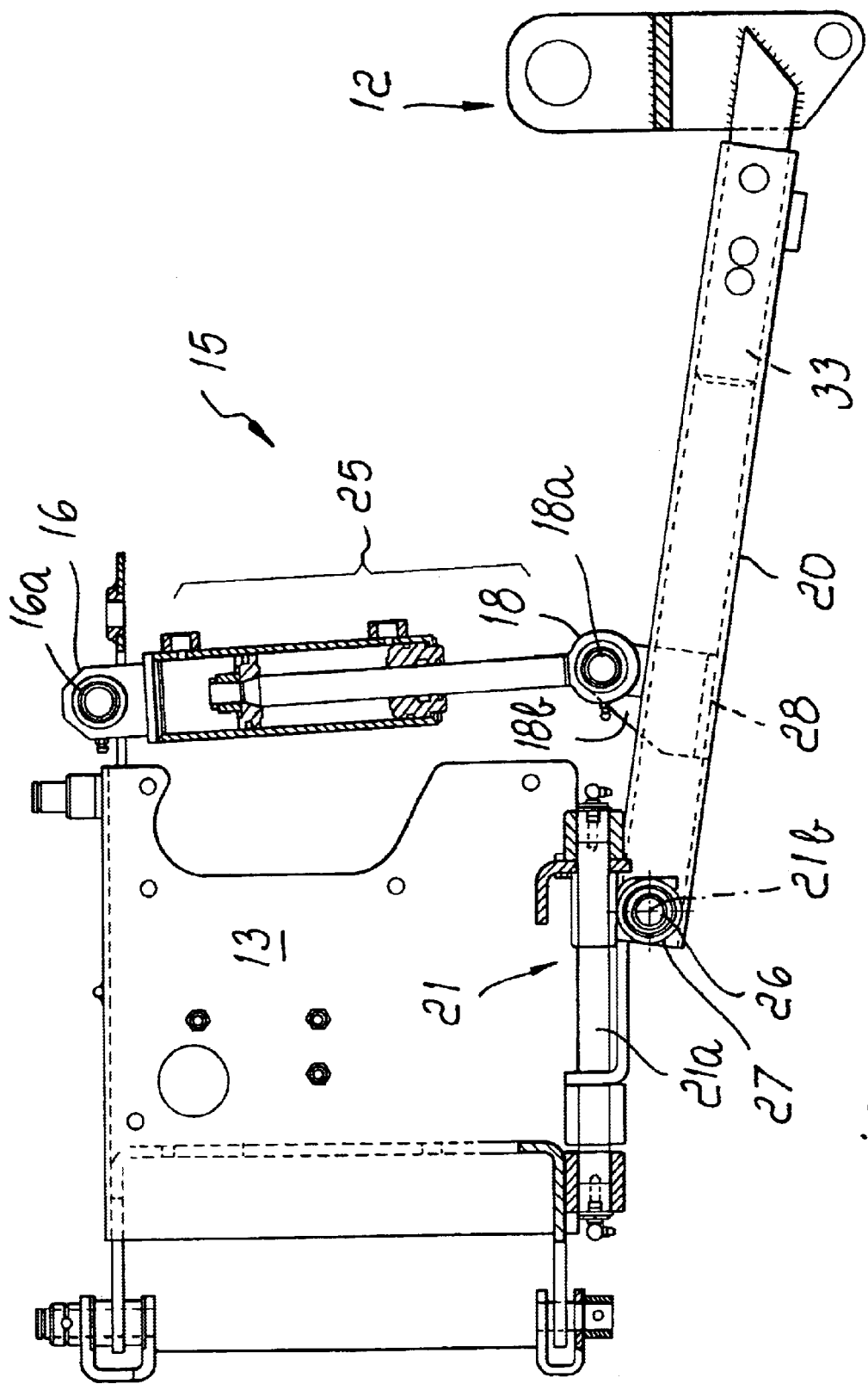
FIG. 4 is a partially sectional enlarged-scale side view of the apparatus of FIG. 1.

With reference to FIGS. 1 to 7, a tool lifting apparatus for gardening vehicles such as lawn mowers or the like having the structure according to the invention is generally designated by the reference numeral 10.

The apparatus 10 comprises a lever-type frame 11, which supports the tool 12 (in this case is of the rotary-blade type, only the protective housing of which is visible in the figures) and is fixed to the chassis 13 of a vehicle that is generally designated by the reference numeral 14 in the figures.

The apparatus 10 comprises, in this case, two parallel actuators 15, each of which has a first end 16 that is fixed, with an interposed spherical joint 16a, to a common first shaft 17 coupled to the chassis 13 of the vehicle 14, while the other, second end, designated by the reference numeral 18, is pivoted, likewise with an interposed spherical joint 18a, to a corresponding first bracket 20 of the frame 11, in particular to a coupling 18b.

An articulated cross-type coupling 21 is pivoted to the frame 13 and to the first brackets 20 along a longitudinal axis 21a and a transverse axis 21b, to the rear of the front axle 22 (shown in dashed lines in FIG. 2) of the front wheels of the vehicle, designated by the reference numeral 23, and to the rear of the actuators 15.

According to the invention, a third-class lever is thus formed with the frame 11 that supports the tool 12, with the lever fulcrum arranged to the rear of the axle 22.

In particular, the two actuators 15 are arranged substantially at right angles to the first brackets 20 of the frame 11 and above them, so as to provide, when they are compressed, the lifting step of the tool 12.

In particular, in this case the actuators 15 are constituted by a corresponding number of fluid-operated cylinders 25.

Furthermore, the first two brackets 20 are pivoted, about the axis 21b, by means of a shaft 26 that is inserted in a first tubular element 27 that is part of the articulated cross-like coupling 21.

The first brackets 20 are constituted, in this case, by longitudinal tubular elements that have a rectangular cross-section and are mutually connected by a welded C-shaped element, which is designated by the reference numeral 28 and is part of the frame 11.

Two second, additional brackets 32 (to which the tool 12 is fixed) are fixed to the first brackets 20, with their first ends 33 inserted and locked in corresponding first ends 34 of the first brackets.

In practice it has been observed that the present invention has achieved the intended aim and objects.

In particular, it should be noted that the apparatus according to the invention achieves the lifting of the tool without displacing its dimensions downwardly (as occurs with the first-class lever) and therefore has less maneuverability problems on uneven ground when the tool is raised.

It should be noted that all of the above has been achieved without compromising at all the operating functionality of the apparatus having the structure according to the invention, which has high flexibility in operation and can be applied in the most disparate types of gardening vehicles.

Attention is also drawn to its relative constructive simplicity, which also achieves an equally great simplicity of use on the part of the operator while nonetheless providing considerable safety in use for the operator.

The materials and the dimensions may be any according to requirements.

The disclosures in Italian Utility Model Application No. PD2001U000058 from which this application claims priority are incorporated herein by reference.

What is claimed is:

1. A tool lifting apparatus for a gardening vehicle having a chassis, a tool supported at the chassis and at least one front axle, the apparatus comprising:

a lever-type frame, which supports the tool; hydraulic cylinder lifting actuators that are coupled in operative configuration between the frame and the vehicle chassis, said lever-type frame being coupled to said vehicle chassis by an articulated cross-type coupling for pivoting said frame so that it can perform oscillations with respect to a longitudinal axis of the vehicle and to a transverse axis and and to define a third-class lever having a lever fulcrum on said transverse axis and arranged to the rear of, and parallel to, the front axle of said vehicle and rearwardly with respect to said actuators.

2. The apparatus of claim 1, wherein said actuators are arranged so as to lift said tool while operating by compression.

3. The apparatus of claim 1, comprising a first shaft coupled to said vehicle chassis, said frame comprising first brackets, and said actuators including two parallel fluid-operated actuators, each of which has a first end that is fixed to said first shaft and a second end that is pivoted to said first brackets of said frame that supports the tool.

4. The apparatus of claim 3, wherein said first and second ends are provided with spherical joints which are interposed between said ends and said first shaft, and said frame, respectively.

5. The apparatus of claim 3, wherein said first brackets are constituted by longitudinal elements that have a substantially rectangular cross-section.

6. The apparatus of claim 5, wherein said first brackets comprise a welded C-shaped element which connect the first brackets to each other.

7. The apparatus of claim 6, comprising two second brackets, which are fixed to said first brackets, said second brackets having first ends thereof being inserted and locked in corresponding fist ends of said first brackets, said tool being fixed to said second brackets.

\* \* \* \* \*